United States Patent
Woo

(10) Patent No.: US 8,555,743 B2
(45) Date of Patent: Oct. 15, 2013

(54) SHIFTING APPARATUS FOR MANUAL TRANSMISSION

(75) Inventor: Myeongju Woo, Jeonju-si (KR)

(73) Assignee: Hyundai Motor Company, Seoul (KR)

( * ) Notice: Subject to any disclaimer, the term of this patent is extended or adjusted under 35 U.S.C. 154(b) by 195 days.

(21) Appl. No.: 13/174,219

(22) Filed: Jun. 30, 2011

(65) Prior Publication Data

US 2012/0137812 A1  Jun. 7, 2012

(30) Foreign Application Priority Data

Dec. 1, 2010  (KR) .......................... 10-2010-0121640

(51) Int. Cl.
*B60K 20/00* (2006.01)
*F16H 59/04* (2006.01)

(52) U.S. Cl.
USPC ...................................................... 74/473.36

(58) Field of Classification Search
USPC ............. 74/335, 35, 353, 354, 395, 396, 397, 74/398, 405, 473.12, 473.36, 473.37
See application file for complete search history.

(56) References Cited

U.S. PATENT DOCUMENTS

| | | | | |
|---|---|---|---|---|
| 3,999,241 | A | * | 12/1976 | Mafnas ........................ 15/250.21 |
| 4,291,586 | A | * | 9/1981 | Buetemeister ................... 74/335 |
| 5,689,997 | A | * | 11/1997 | Schaller ........................... 74/335 |
| 6,990,872 | B2 | * | 1/2006 | Chen ................................ 74/335 |
| 7,240,579 | B2 | * | 7/2007 | Chen ................................ 74/354 |
| 7,845,249 | B2 | * | 12/2010 | Jayaram et al. ................. 74/335 |

FOREIGN PATENT DOCUMENTS

| | | |
|---|---|---|
| JP | 2000-035127 A | 2/2000 |
| JP | 2009-257515 | 11/2009 |
| KR | 1019990072355 A | 9/1999 |
| KR | 10-2000-0034936 A | 6/2000 |
| KR | 1020050101973 A | 10/2005 |
| KR | 1020090040074 A | 4/2009 |

* cited by examiner

*Primary Examiner* — Troy Chambers
*Assistant Examiner* — Michael Gonzalez
(74) *Attorney, Agent, or Firm* — Morgan, Lewis & Bockius LLP

(57) ABSTRACT

A shifting apparatus for a manual transmission automatically performs a selecting operation and a shifting operation through the driving of one motor according to a shift step level of a shift lever at the time when a driver operates the shift lever. The apparatus includes a driving motor with a rotation shaft on which a main gear is mounted, a connecting gear unit disposed in front of the rotation shaft of the driving motor and selectively transferring rotation of the driving motor according to a position signal of the shift lever, a selecting unit disposed at one side of the connecting gear unit to correspond to a shift fork connected with the shift fork mounted at one side of the control shaft and selectively connected with the connecting gear unit to selectively move the shift fork on the control shaft, and a shifting unit disposed at the other side of the connecting gear unit to correspond to the selecting unit, connected to the other side of the control shaft and selectively connected with the connecting gear unit to rotate the control shaft.

11 Claims, 9 Drawing Sheets

SHIFTING APPARATUS FOR MANUAL TRANSMISSION

CROSS-REFERENCE TO RELATED APPLICATION

This application claims priority to and the benefit of Korean Patent Application No. 10-2010-0121640 filed Dec. 1, 2010, the entire contents of which application is incorporated herein for all purposes by this reference.

BACKGROUND OF INVENTION

1. Field of Invention

The present invention relates to a shifting apparatus for a manual transmission, and more particularly, to a shifting apparatus for a manual transmission that performs substantial shifting with an accurate stroke by automatically performing a selecting operation and a shifting operation through the driving of one motor according to a position of a shift lever at the time when a driver operates the shift lever.

2. Description of Related Art

In general, a transmission for converting a motive power of an engine to an appropriate driving power is installed in a vehicle and the transmission is classified into a manual transmission, an automatic transmission, and a continuously variable transmission according to an operation mode.

Among them, a shifting apparatus applied to the manual transmission, which transmits an operating force of the shifting lever to the manual transmission to achieve a shift, is constituted by a selecting cable and a shifting cable transmitting the operating force by the shifting operation of the shifting lever, a control shaft assembly connected with the selecting and shifting cables, and a shift fork assembly mounted between the control shaft assembly and a synchronizing device of the transmission to perform shifting by operating the synchronizing device according to operating of the control shaft assembly.

Herein, the control shaft assembly includes a control shaft connected with the shift lever and performing a linear reciprocating motion and a revolving motion by the operating force of the shift lever and a plurality of control fingers are mounted on the control shaft.

In addition, the shift fork assembly includes a shift fork that revolves around a predetermined hinge point to move a sleeve in the transmission and a rug member is configured in the shift fork so as to receive the operating force by each control finger.

That is, in the control shaft assembly receiving the operating force of the shift lever, a corresponding control finger among the control fingers rotates the shift fork through the rug member to allow a synchro mechanism provided for each corresponding shift step to operate.

However, when a driver moves the shift lever to a desired shift step, since the control shaft connected by cables, and the like is operated to perform the selecting operation and the shifting operation, the shifting apparatus for the manual transmission in the related art has inconvenience in that the driver should perform the shift in person by operating a clutch according to a driving condition.

Accordingly, the development of the shifting apparatus capable of automatically performing shifting is actually required at the time of operating a shift step to meet the driving condition without the driver's operating the clutch.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a shifting apparatus for a manual transmission to operate a selecting operation and a shifting operation of a control shaft by sensing driver's operating of a shift lever, the apparatus including a driving motor with a rotation shaft on which a main gear is mounted, a connecting gear unit disposed in front of the rotation shaft of the driving motor and selectively transferring rotation of the driving motor according to a position signal of the shift lever, a selecting unit disposed at one side of the connecting gear unit to correspond to a shift fork connected with the shift fork mounted at one side of the control shaft and selectively connected with the connecting gear unit to selectively move the shift fork on the control shaft, and a shifting unit disposed at the other side of the connecting gear unit to correspond to the selecting unit, connected to the other side of the control shaft and selectively connected with the connecting gear unit to rotate the control shaft.

The connecting gear unit may include a connection plate provided selectively rotatable around a hinge pin provided in a mounting bracket and including first and second rotation shafts mounted on both sides thereof, respectively, first and second connecting gears mounted on the first and second rotation shafts, respectively, and an operating member receiving a control signal from a transmission control unit (TCU) to selectively engage the main gear in any one of the selecting unit and the shifting unit through the first and second connecting gears at the time of operating the shift lever.

The operating member may include first and second electromagnets each mounted on the mounting bracket to correspond to the first and second rotation shafts and generating a magnetic force by an electrical signal of the TCU to engage any one of the selecting unit and the shifting unit in the main gear by rotating the connection plate, and first and second elastic members interconnecting the mounting bracket and the connection plate and providing a restoration force to the connection plate to restore the connection plate to an initial mounting position.

The first and second electromagnets may rotate the connection plate around the hinge pin by selectively pulling the first and second rotation shafts according to the electrical signal of the TCU.

The first and second elastic members may be formed by coil springs of which each one end is connected to an upper center of the mounting bracket and the other end is connected to each of both sides of the connection plate.

The selecting unit may include a selecting gear provided at one side of the main gear to correspond to the first connecting gear, a selecting lead screw connected to the selecting gear and rotating together with the selecting gear, a selecting movement block engaged in the selecting lead screw movable along the selecting lead screw with the rotation of the selecting lead screw, a selecting shaft disposed vertically to the selecting lead screw, a selecting fork connected with the selecting shaft and moving the shift fork on the control shaft with rotation of the selecting shaft, and a selecting yoke having one end connected to the selecting movement block and the other end connected to rotate the selecting shaft with movement of the selecting movement block.

The selecting movement block may include a first suspending protrusion that protrudes and the selecting yoke may include a selecting yoke groove into which the first suspending protrusion is inserted.

In the shift fork, a fixation protrusion into which the selecting fork is inserted may be formed on the outer periphery of the shift fork.

The apparatus may further include a first position sensor provided at one side of the selecting shaft to sense a rotation amount of the selecting shaft.

The shifting unit may include a shift gear provided at the other side of the main gear to correspond to the second connecting gear, a shift lead screw connected with the shift gear and rotating together with the shift gear, a shift movement block engaged in the shift lead screw movable along the shift lead screw with rotation of the shift lead screw, and a shift yoke connected to the shift movement block and connected to the other side of the control shaft to rotate the control shaft with movement of the shift movement block.

The shift movement block may include a second suspending protrusion that protrudes and the shift yoke may include a shift yoke groove into which the second suspending protrusion is inserted.

The apparatus may further include a second position sensor mounted on the other side of the control shaft to verify a shift step by sensing a rotation amount of the control shaft rotated by the shifting unit.

As described above, according to various aspects of the present invention, a shifting apparatus of a manual transmission performs shifting operation with an accurate stroke by automatically performing a selecting operation and a shifting operation through the driving of one motor according to a position of a shift lever at the time when a driver operates the shift lever, to thereby make it possible to improve durability of a transmission by reducing an impact force exerted to a synchro in shifting.

Further, the shifting operation is automatically achieved by selectively driving with one motor a selecting unit and a shifting unit that convert a rotating motion into a linear motion and transfer the linear motion to the control shaft to thereby save a manufacturing cost.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
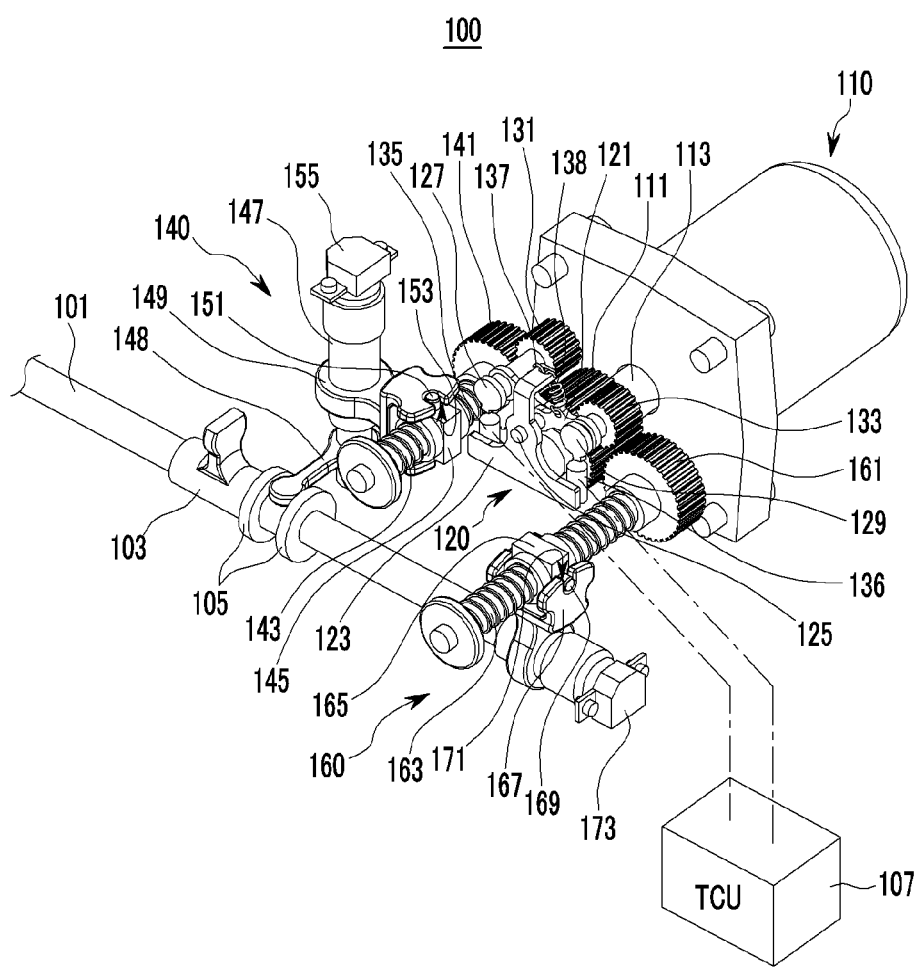
FIG. 1 is a perspective view of an exemplary shifting apparatus for a manual transmission according to the present invention.
Figure 2:
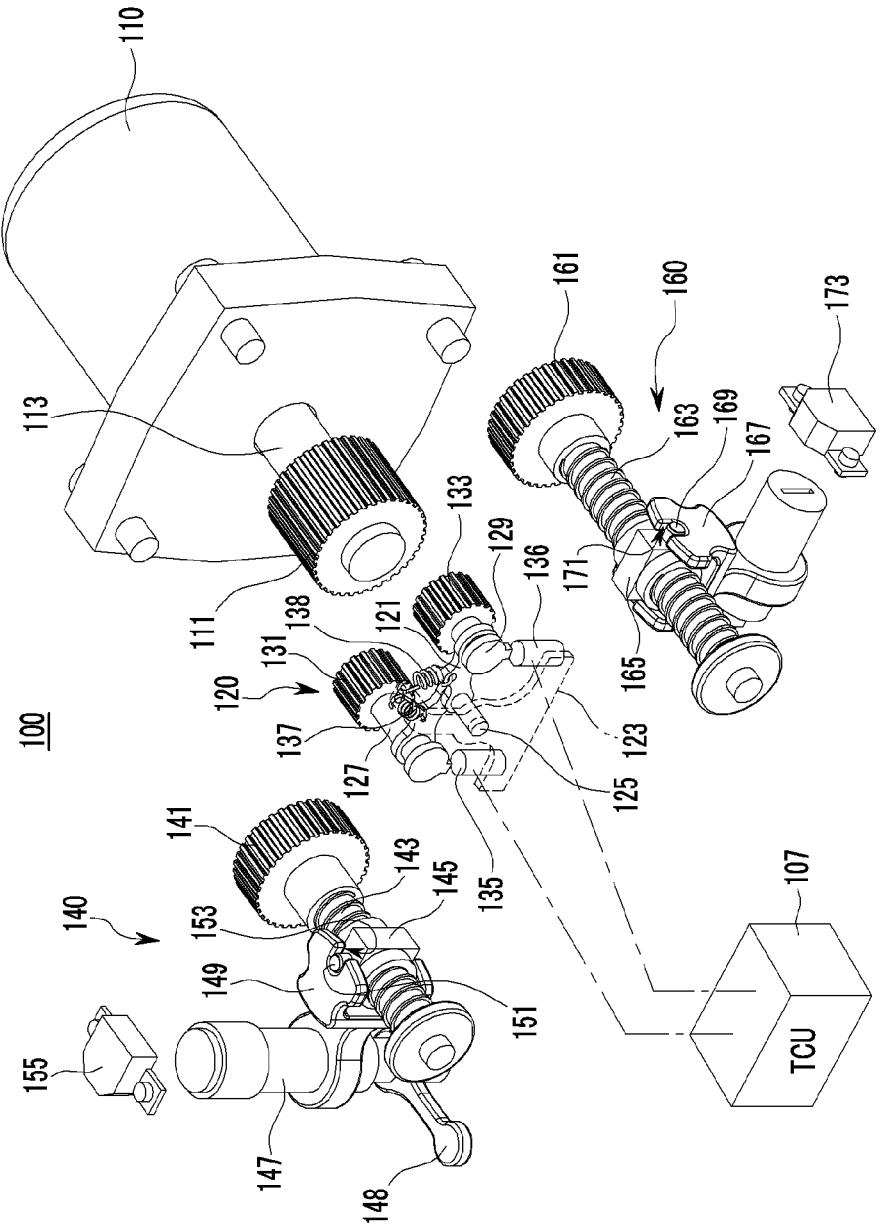
FIG. 2 is an exploded perspective view of an exemplary shifting apparatus for a manual transmission according to the present invention.

Referring to FIGS. 1 and 2, the shifting apparatus 100 for the manual transmission according to various embodiments of the present invention achieves shifting with an accurate stroke by automatically performing a selecting operation and a shifting operation through the driving of one motor according to a shift step level of a shift lever when a driver operates the shift lever.

For this, the shifting apparatus 100 for the manual transmission according to various embodiments of the present invention is used to enable automatically the selecting and shifting operations of a control shaft 101 by sensing driver's operation of the shift lever and includes a driving motor 110, a connecting gear unit 120, a selecting unit 140, and a shifting unit 160, as shown in FIGS. 1 and 2.

First, the driving motor 110 is provided outside a housing above the transmission and a rotation shaft 113 on which a main gear 111 is mounted is disposed in a vertical direction to the control shaft 101 in the housing.

The connecting gear unit 120 is disposed in front of the rotation shaft 113 of the driving motor 110 in the housing and selectively transfers a rotation force of the driving motor 110 according to a position signal of the shift lever.

Herein, the connecting gear unit 120 includes a connection plate 121, first and second connecting gears 131 and 133, and an operating member.

In various embodiments, the connection plate 120 is provided in a mounting bracket 123 mounted vertically to the rotation shaft 113 in front of the rotation shaft of the driving motor 110 selectively rotatable through a hinge pin 125.

First and second rotation shafts 127 and 129 are mounted on both sides of the connection plate 121, respectively.

The first and second connecting gears 131 and 133 are rotatably mounted on the first and second rotation shafts 127 and 129, respectively.

In the figures, the first and second connecting gears 131 and 133 are spaced apart from the main gear 111 by a predetermined interval, but not limited thereto and the first and second connecting gears 131 and 133 may be disposed to transfer rotation selectively to any one of the selecting unit 140 and the shifting unit 160 while the first and second connecting gears 131 and 133 are engaged in the main gear 111.

In addition, the operating member 135 receives a control signal from a transmission control unit (TCU) 107 to transfer the rotation of the main gear 111 to any one of the selecting unit 140 and the shifting unit 160 through the first and second connecting gears 131 and 133 at the time of operating the shift lever.

Herein, since the operation of the TCU is apparent to those skilled in the art, a detailed description thereof will be omitted.

The operating member includes first and second electromagnets 135 and 136 and first and second elastic members 137 and 138 and hereinafter, the components will be described in more detail.

First, the first and second electromagnets 135 and 136 are mounted on both lower sides of the mounting bracket 123, respectively to correspond to the first and second rotation shafts 127 and 129.

The first and second electromagnets 135 and 136 selectively generate a magnetic force by an electrical signal of the TCU 7 according to the operating of the shift lever to rotate the connection plate 121 toward the selecting unit 140 or the shifting unit 160 around the hinge shaft 125.

Therefore, each of the connection gears 131 and 133 is selectively engaged in the main gear 111 to selectively operate the selecting unit 140 and the shifting unit 160.

Herein, the first and second electromagnets 135 and 136 selectively pull the first and second rotation shafts 127 and 129 by the magnetic force to rotate the connection plate 121 around the hinge pin 125, when the magnetic force is generated by the electrical signal of the TCU 107.

In addition, the first and second elastic members 137 and 138 interconnect the mounting bracket 123 and the connection plate 121 and provide a repulsive force to the connection plate 123 to restore the connection plate 121 to an initial position when the magnetic force of each of the electromagnets 135 and 136 is removed.

The first and second elastic members 137 and 138 may be formed by coil springs each having one end connected to an upper center of the mounting bracket 123 and having the other end connected to each of both sides of the connection plate 121.

That is, when the electrical signal is applied to each of the electromagnets 135 and 136 of the operating member from the TCU 107 according to the operating of the shift lever, the connecting gear unit 120 having the above configuration selectively generates the magnetic force to engage the main gear 11 in any one of the selecting unit 140 and the shifting unit 160 through the first and second connecting gears 131 and 133.

In addition, when the shift lever does not operate, the TCU 107 does not apply the electrical signal to each of the electromagnets 135 and 136 so as to stop the generation of the magnetic force. In this case, each of the elastic members 137 and 138 provides the repulsive force to the connection plate 121 to restore the connection plate 121 to the initial position.

In various embodiments, the selecting unit 140 is disposed at one side of the connecting gear unit 120 to correspond to a shift fork 103 connected with the shift fork 103 mounted at one side of the control shaft 101.

The selecting unit 140 selectively reciprocates the shift fork 103 on the control shaft 101 to a position corresponding to the shift step by receiving the rotation force of the driving motor 110 through the operating of the connecting gear unit 120.

Herein, the selecting unit 140 is configured in a housing and includes a selecting gear 141, a selecting lead screw 143, a selecting movement block 145, a selecting shaft 147, and a selecting yoke 149.

First, the selecting gear 141 is disposed at one side of the main gear 111 to correspond to the first connecting gear 131.

The selecting lead screw 143 is connected with the selecting gear 141 to rotate together with the selecting gear 141.

In various embodiments, the selecting movement block 145 is engaged in the selecting lead screw 143 to movable along the selecting lead screw 143 with the rotation of the selecting lead screw 143.

In addition, the selecting shaft 147 is disposed vertically to the selecting lead screw 143 and a selecting fork 148 is mounted at one lower side of the selecting shaft 147 to correspond to the shift fork 103 connected with the shift fork 103 through the selecting fork 148.

Herein, fixation protrusions 105 integrally and/or monolithcally protrude on both outer peripheries of the shift fork 103 to correspond to the selecting fork 148 and the selecting forks 148 are interconnected in the state where the selecting fork 148 is disposed between the fixation protrusions 105.

Each fixation protrusion 105 may be formed on the outer periphery of the shift fork 103.

Meanwhile a first position sensor 155 sensing a rotation amount of the selecting shaft 147 is mounted on the top of the selecting shaft 147.

The first position sensor 155 senses the rotation amount of the selecting shaft 147 and outputs the sensed signal to the TCU 107. Therefore, the TCU 107 judges a position of the selecting fork 148 according to the sensed signal by the first position sensor 155.

In various embodiments, one end of the selecting yoke 149 is connected to the selecting movement block 145 and the other end of the selecting yoke 149 is connected to the selecting shaft 147 to rotate the selecting shaft 147 with movement of the selecting movement block 145.

Herein, a first suspending protrusion 151 is formed in the selecting movement block 145 and a selecting yoke groove 153 into which the first suspending protrusion 151 is inserted is formed in the selecting yoke 149.

That is, the selecting gear 141 is engaged in the main gear 111 through the first connecting gear 131 according to the operating of the connecting gear unit 120, such that the above-configured selecting unit 140 receives the driving force of the driving motor 110.

Therefore, the selecting lead screw 143 that rotates together with the selecting gear 141 rotates, causing the selecting movement block 145 selectively moved depending on a rotational direction of the driving motor 110.

In this case, the selecting shaft 147 rotates selectively when the selecting movement block 145 moves through the selecting yoke 149 and at the same time, the selecting fork 148 also rotates, and as a result, the shift fork 103 moves on the control shaft 101.

Therefore, the position of the shift fork 103 moves to correspond to the corresponding shift step.

In addition, the shifting unit 160 is disposed at the other side of the connecting gear unit 120 to correspond to the selecting unit 140.

The shifting unit 160 is connected to the other side of the control shaft 101 and operates by receiving the rotation force of the driving motor 110 through the operating of the connecting gear unit 120 and selectively rotates the control shaft 101 so as to operate the synchro mechanism provided for each shift step with the shift fork 103.

Herein, the shifting unit 160 includes a shift gear 161, a shift lead screw 163, a shift movement block 165, and a shift yoke 167.

First, the shift gear 161 is disposed at the other side of the main gear 111 to correspond to the second connecting gear 133.

The shift lead screw 163 is mounted on a rotation center of the shift gear 161 to rotate together with the shift gear 161.

In various embodiments, the shift movement block 165 is engaged in the shift lead screw 163 movable on the shift lead screw 163 that rotates by the rotation of the shift gear 161.

In addition, one end of the shift yoke 167 is connected to the bottom of the shift movement block 165 and the other end of the shift yoke 167 is connected to the other side of the control shaft 101 to rotate the control shaft 101 with the movement of the shift movement block 165.

Herein, a second suspending protrusion 169 is formed in the shift movement block 165 and a shift yoke groove 171 into which the second suspending protrusion 169 is inserted is formed in the shift yoke 167 intercoupled with the shift movement block 165.

Meanwhile, a second position sensor 173 for verifying the shift step by sensing a rotation amount of the control shaft 101 rotated by the shifting unit 160 is mounted on the other side of the control shaft 101.

The second position sensor 173 senses the rotation amount of the control shaft 101 rotated by the operating of the shifting unit 160 and outputs the sensed signal to the TCU 107.

Therefore, the TCU 107 judges a rotation amount of the shift fork 103 according to the rotation amount of the control shaft 101 through the sensed signal by the second position sensor 173.

That is, the shift gear 161 is engaged in the main gear 111 through the second connecting gear 133 according to the operating of the connecting gear unit 120, such that the above-configured shifting unit 160 receives the driving force of the driving motor 110.

Therefore, the shift lead screw 163 rotates together with the shift gear 161, causing the shift movement block 165 selectively moved depending on the rotation direction of the driving motor 110.

In this case, the control shaft 101 rotates selectively when the shift movement block 165 moves through the shift yoke 167 and at the same time, rotates the shift fork 103.

As a result, the shift fork 103 performs a shifting operation by operating the synchro mechanism provided for each shift step.

Herein, operations and actions of the shifting apparatus for the manual transmission according to various embodiments of the present invention configured as above will be described in detail.

Figure 3:
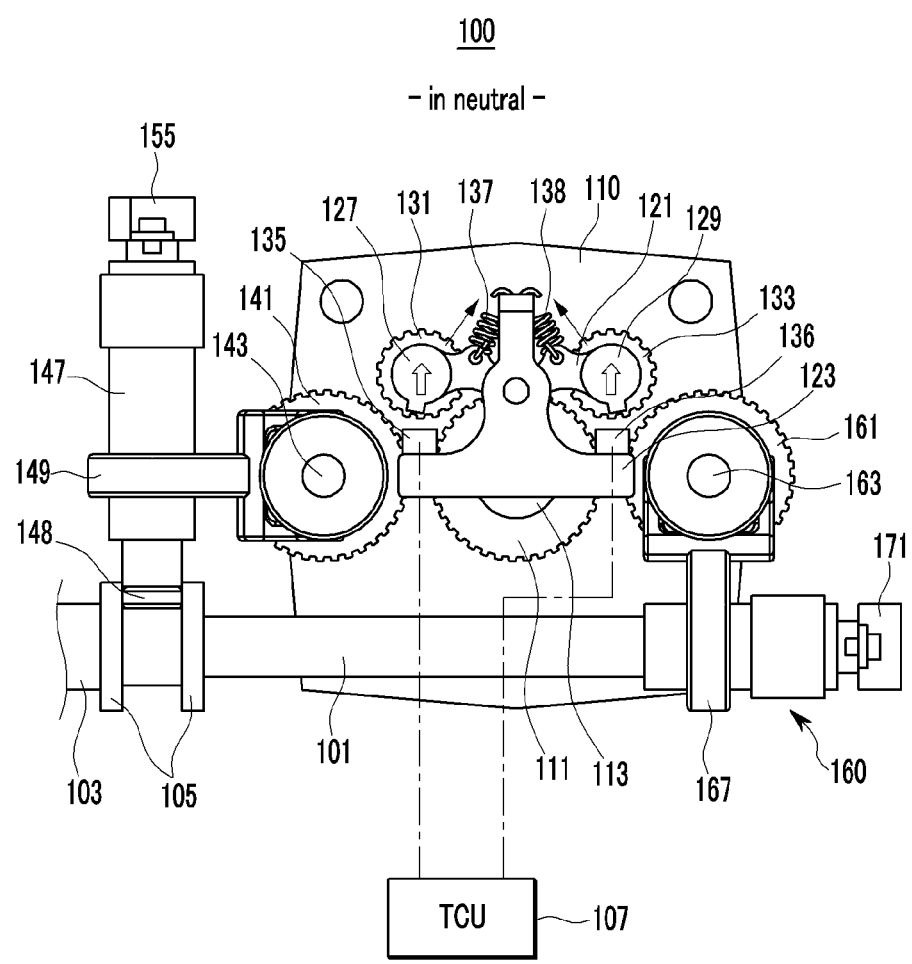
FIG. 3 is a diagram showing an operational state when an exemplary shifting apparatus for a manual transmission is in neutral according to the present invention.

Referring to FIG. 3, when the shift lever is in neutral, the TCU 107 of the shifting apparatus 100 does not apply the electrical signal to each of the electromagnets 135 and 136, and as a result, the magnetic force is not generated.

Therefore, the connection plate 121 maintains an initial mounting position by the repulsive force of each of the elastic members 137 and 138.

As a result, each of the connecting gears 131 and 133 is spaced apart from the top of the main gear 111 to thereby prevent the main gear 111 and the selecting gear 141 or the shift gear 161 from being engaged.

Figure 4:
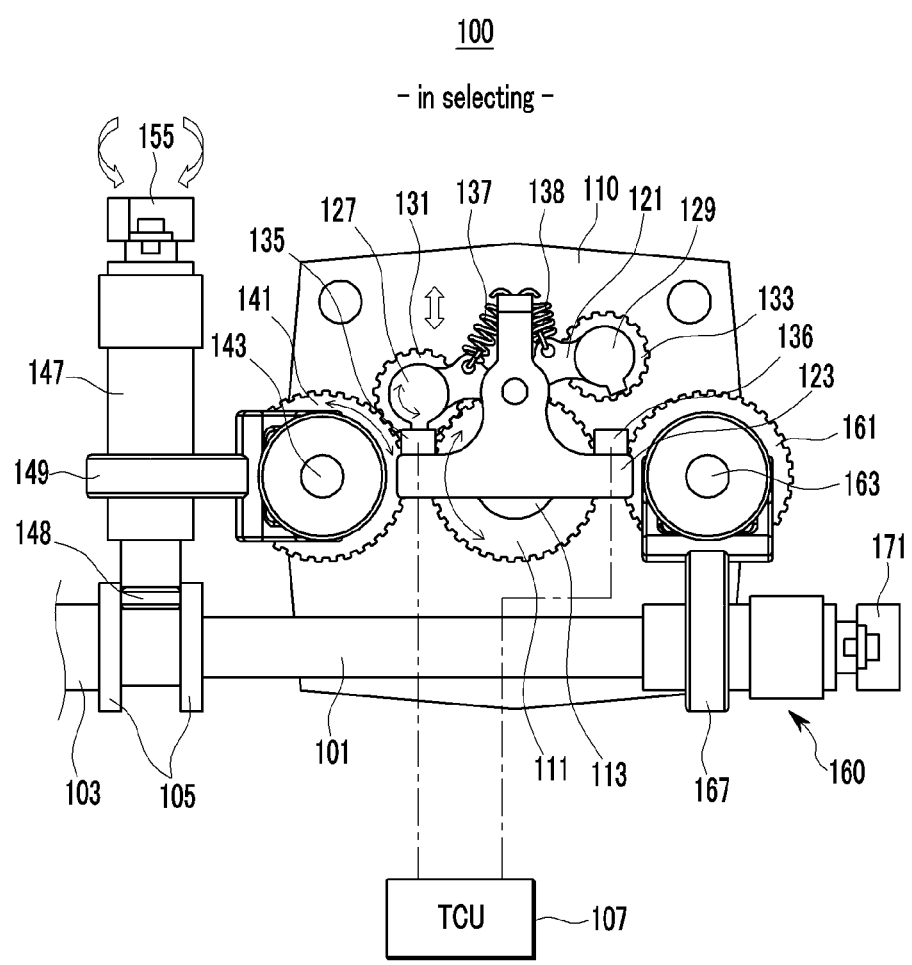
FIGS. 4, 5, 6 and 7 are diagrams showing an operational state when an exemplary shifting apparatus for a manual transmission performs a selecting operation according to the present invention.

In the shifting apparatus 100, when a driver performs a selecting operation to, for example, a R/1 step or a 4/5 step by operating the shift lever in the neutral state of FIG. 3, the TCU 107 applies the electrical signal to the first electromagnet 135 to generate the magnetic force, as shown in FIG. 4.

Therefore, the first rotation shaft 127 is pulled toward the first electromagnet 135 by the magnetic force of the first electromagnet 135. In this case, the connection plate 121 rotates toward the selecting unit 140 around the hinge pin 125.

As a result, the first connecting gear 131 is engaged in the main gear 111 and the selecting gear 141. Herein, the driving motor 110 rotates in a forward direction or a reverse direction by the control signal of the TCU 107.

Figure 5:
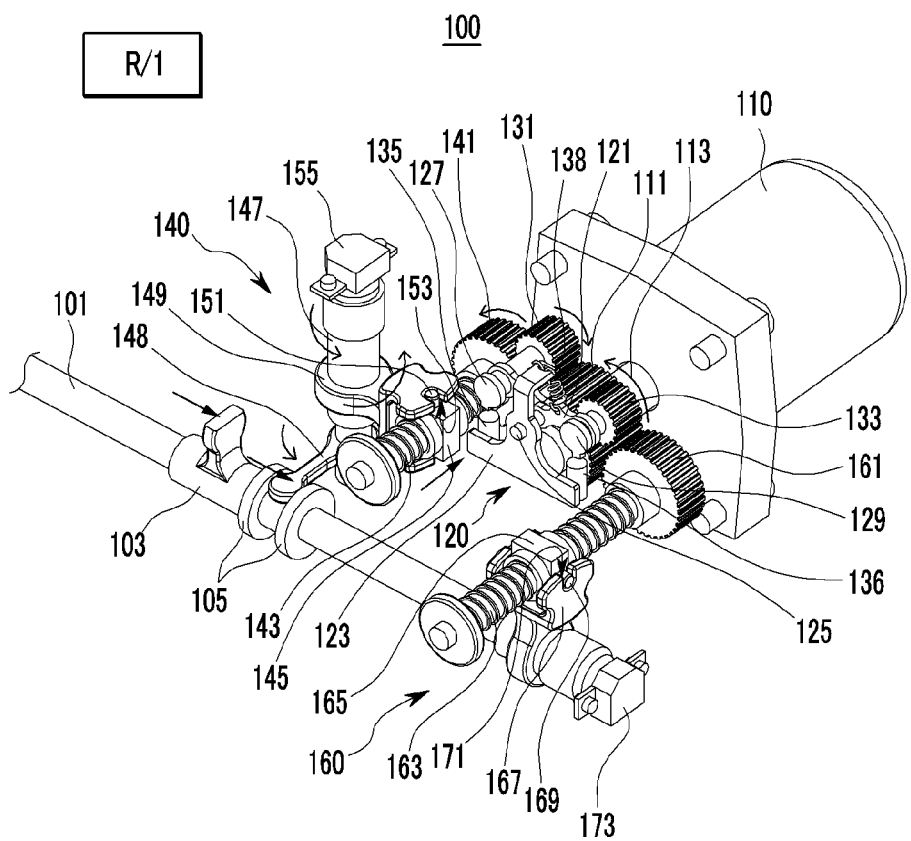

First, when the driver moves the shift lever to the R/1 step, while the main gear 111 of the driving motor 110 rotates in a counterclockwise direction, the main gear 111 transfers the rotation force to the selecting gear 141 through the first connecting gear 131, as shown in FIG. 5.

Therefore, the selecting gear 141 rotates in the counterclockwise direction together with the main gear 111 and at the same time, the selecting lead screw 143 also rotates in the same direction to move the selecting movement block 145 to the selecting gear 141.

As a result, while the selecting yoke 149 rotates toward the selecting gear 141 by the selecting movement block 145, the selecting yoke 149 rotates the selecting shaft 147.

In this case, the selecting fork 148 is rotated by the selecting shaft 147 to move the shift fork 103 on the control shaft 101 toward the shifting unit 160, that is, the R/1 step.

Accordingly, the shift fork 103 is positioned in the R/1 step and in this case, the first position sensor 155 senses the rotation amount of the selecting shaft 101 and outputs the sensed signal to the TCU 107.

In this case, the TCU 107 compares an output signal of the first position sensor 155 with a predetermined setting value and when the output value is equal to the predetermined setting value, the TCU 107 stops application of the electrical signal to the first electromagnet 135.

Therefore, the first connecting gear 131 is separated from the first electromagnet 135 losing the magnetic force. In addition, the connection plate 121 rotates to the initial position by the repulsive force of the first elastic member 137 to disengage the main gear 111 and the selecting gear 141 from each other.

As a result, the shifting apparatus 100 is restored to the initial position which is the neutral state as shown in FIG. 3.

Figure 6:
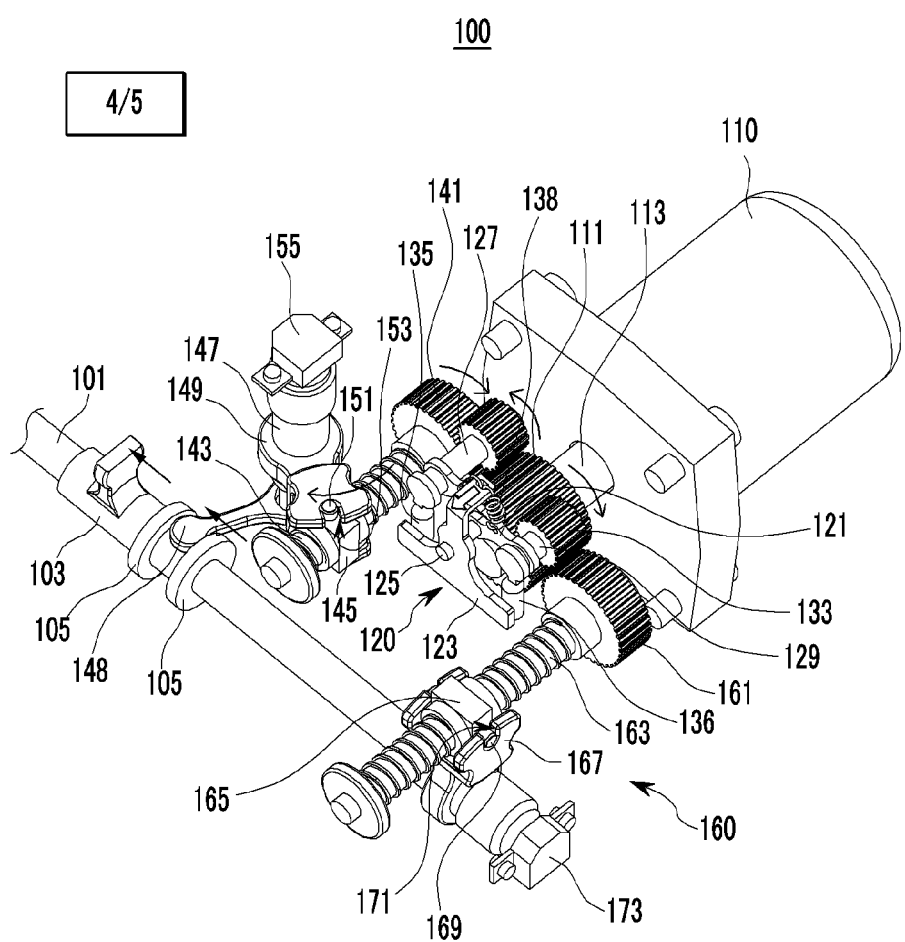

To the contrary, when the driver moves the shift lever to, for example, the 4/5 step, the main gear 111 of the driving motor 110 rotates in a clockwise direction and transfers the rotation force to the selecting gear 141 through the first connecting gear 131, as shown in FIG. 6.

Therefore, the selecting gear 141 rotates in the clockwise direction together with the main gear 111 and at the same time, the selecting lead screw 143 also rotates in the same direction to move the selecting movement block 145 to the control shaft 101.

As a result, while the selecting yoke 149 rotates toward the control shaft 101 by the selecting movement block 145, the selecting yoke 149 rotates the selecting shaft 147.

In this case, the selecting fork 148 is rotated by the selecting shaft 147 to move the shift fork 103 on the control shaft 101 in an opposite direction to the R/1 step.

Accordingly, the shift fork 103 is positioned in the 4/5 step and in this case, and in this case, the first position sensor 155 senses the rotation amount of the selecting shaft 147 and outputs the sensed signal to the TCU 107. Since the shift fork 103 performs the same controlling operation as in the selecting operation of the R/1 step described above, a detailed description thereof will be omitted hereinafter.

Figure 7:
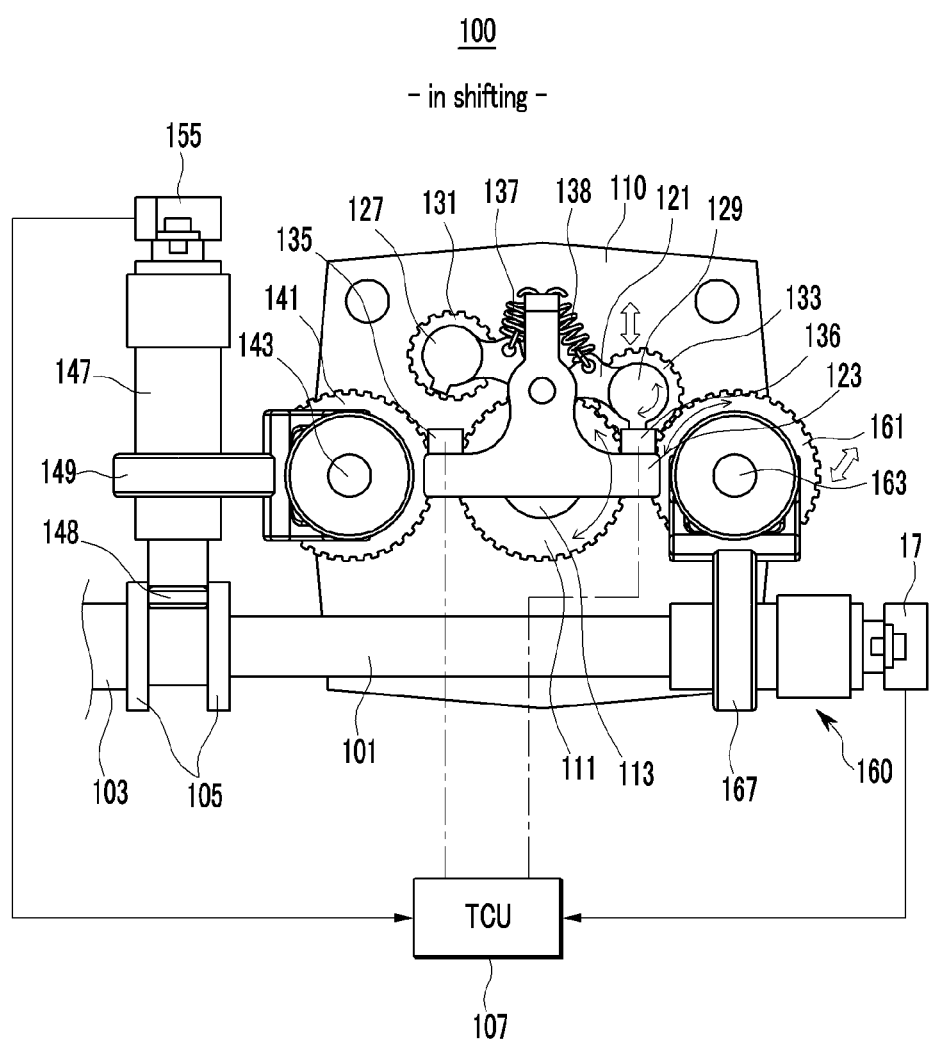
Figure 8:
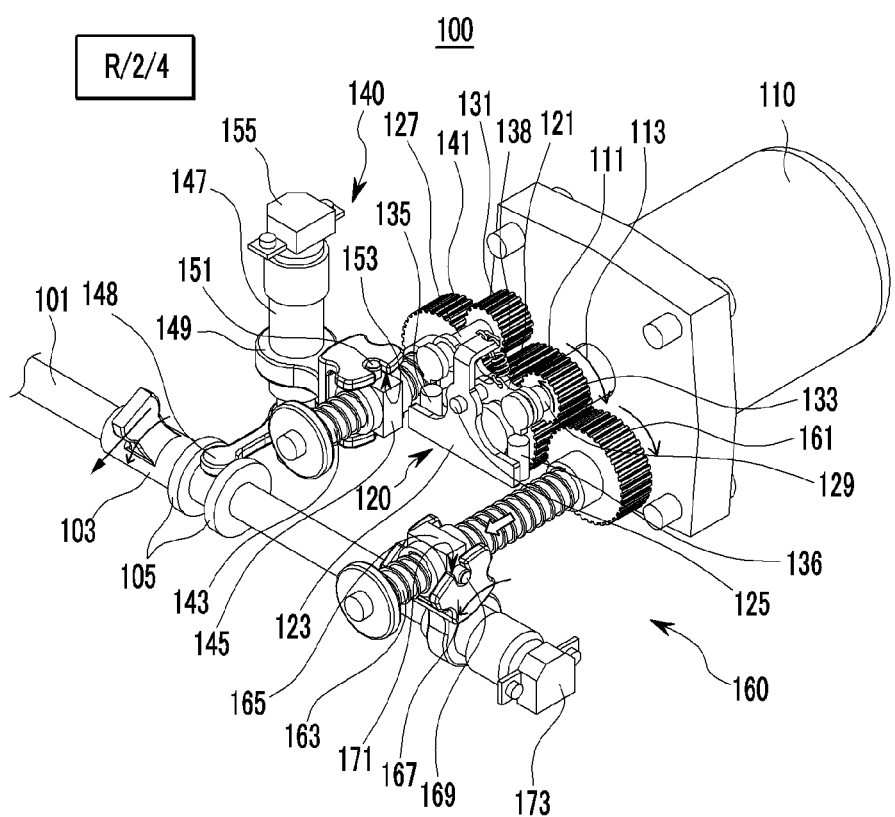
FIGS. 8 and 9 are diagrams showing an operational state when an exemplary shifting apparatus for a manual transmission performs a shifting operation according to the present invention.

Referring to FIGS. 7 and 8, in the shifting apparatus 100, when the driver completes the selecting operation to, for example, the R/1 step or the 4/5 step and thereafter, performs the shifting operation in the neutral state of FIG. 3 by operating the shift lever, the TCU 107 applies the electrical signal to the second electromagnet 136 to generate the magnetic force, as shown in FIG. 7.

Therefore, the second rotation shaft 129 is pulled toward the second electromagnet 136 by the magnetic force of the second electromagnet 136. In this case, the connection plate 121 rotates toward the shifting unit 160 around the hinge pin 125.

As a result, the second connecting gear 133 is engaged in the main gear 111 and the shift gear 161. Herein, the driving motor 110 rotates in the forward direction or reverse direction by the control signal of the TCU 107.

First, when the driver performs a shifting operation to, for example, an R/2/4 step by operating the shift lever of which the selecting operation is completed, while the main gear 111 of the driving motor 110 rotates in the clockwise direction, the main gear 111 transfers the rotation force to the shift gear 161 through the second connecting gear 133, as shown in FIG. 8.

Therefore, the shift gear 161 rotates in the clockwise direction together with the main gear 111 and at the same time, the shift lead screw 163 also rotates in the same direction to move the shift movement block 165 to the control shaft 101.

As a result, while the shift yoke 167 rotates the control shaft 101 in a left direction on the basis of the figure by the shift movement block 165.

In this case, while the shift fork 103 rotates in the same direction as the control shaft 101, the shift fork 103 completes the shifting operation by operating the synchro mechanism to correspond to the shift step of the R/2/4 step.

Herein, the second position sensor 173 senses the rotation amount of the control shaft 101 and outputs the sensed signal to the TCU 107.

In this case, the TCU 107 compares an output signal of the second position sensor 173 with a predetermined setting value and when the output value is equal to the predetermined setting value, the TCU 107 stops application of the electrical signal to the second electromagnet 136.

Therefore, the second connecting gear 133 is separated from the second electromagnet 136 losing the magnetic force. In addition, the connection plate 121 rotates to the initial position by the repulsive force of the second elastic member 138 to disengage the main gear 111 and the shift gear 161 from each other.

As a result, the shifting apparatus 100 is restored to the initial position which is the neutral state, as shown in FIG. 3.

Figure 9:
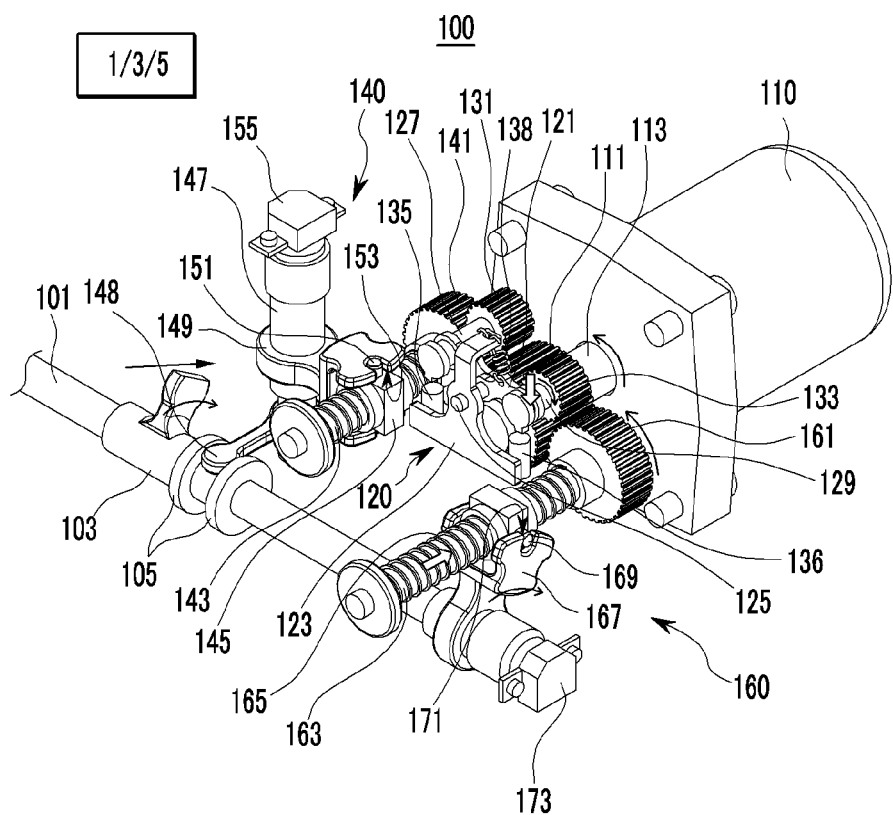

To the contrary, when the driver performs a shifting operation to, for example, a 1/3/5 step by operating the shift lever of which the selecting operation is completed, while the main gear 111 of the driving motor 110 rotates in the counterclockwise direction, the main gear 111 transfers the rotation force to the shift gear 161 through the second connecting gear 133, as shown in FIG. 9.

Therefore, the shift gear 161 rotates in the counterclockwise direction together with the main gear 111 and at the same time, the shift lead screw 163 also rotates in the same direction to move the shift movement block 165 to the driving motor 110.

As a result, the shift yoke 167 rotates the control shaft 101 in a right direction on the basis of the figure by the shift movement block 165.

In this case, while the shift fork 103 rotates in the same direction as the control shaft 101, the shift fork 103 completes the shifting operation by operating the synchro mechanism to correspond to the shift step of the /1/3/5 step.

In this case, the second position sensor 173 senses the rotation amount of the control shaft 101 and outputs the sensed signal to the TCU 107, and since the second position sensor 173 performs the same control operation as in the shifting operation of the R/2/4 step, a detailed description thereof will be omitted hereinafter.

According to various embodiments of the present invention, the shifting apparatus 100 of the manual transmission configured above performs shifting with an accurate stroke by automatically performing the selecting operation and the shifting operation through the driving of one motor according to the position of the shift lever at the time when the driver operates the shift lever, to thereby make it possible to improve durability of the transmission by reducing the impact force exerted to the synchro in shifting.

Further, the shifting operation is automatically achieved by selectively driving with one motor through the connecting gear unit 120 the selecting unit 140 and the shifting unit 160 that convert a rotating motion of the driving motor 110 into a linear motion and transfer the linear motion to the control shaft 101 to thereby save a manufacturing cost.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shifting apparatus for a manual transmission to operate a selecting operation and a shifting operation of a control shaft by sensing a driver operating a shift lever, the apparatus comprising:
    a driving motor including a rotation shaft on which a main gear is mounted;
    a connecting gear unit disposed in front of the rotation shaft of the driving motor and selectively transferring rotation of the driving motor according to a position signal of the shift lever;
    a selecting unit disposed at one side of the connecting gear unit operably connected to a shift fork mounted at one side of the control shaft and selectively connected with the connecting gear unit to selectively move the shift fork on the control shaft; and
    a shifting unit disposed at another side of the connecting gear unit connected to another side of the control shaft and selectively connected with the connecting gear unit to rotate the control shaft;
    wherein the connecting gear unit includes:
        a connection plate provided selectively rotatable around a hinge pin provided in a mounting bracket and including first and second rotation shafts mounted on both sides thereof, respectively;
        first and second connecting gears mounted on the first and second rotation shafts, respectively; and
        an operating member receiving a control signal from a transmission control unit (TCU) to selectively engage the main gear in any one of the selecting unit and the shifting unit through the first and second connecting gears at the time of operating the shift lever.

2. The apparatus of claim 1, wherein:
    the operating member includes:
    first and second electromagnets each mounted on the mounting bracket to correspond to the first and second rotation shafts and generating a magnetic force by an electrical signal of the TCU to engage any one of the selecting unit and the shifting unit in the main gear by rotating the connection plate; and
    first and second elastic members interconnecting the mounting bracket and the connection plate and providing a restoration force to the connection plate to restore the connection plate to an initial mounting position.

3. The apparatus of claim 2, wherein:
the first and second electromagnets
rotate the connection plate around the hinge pin by selectively pulling the first and second rotation shafts according to the electrical signal of the TCU.

4. The apparatus of claim 2, wherein:
the first and second elastic members
are formed by coil springs of which each one end is connected to an upper center of the mounting bracket and another end is connected to each of both sides of the connection plate.

5. The apparatus of claim 1, wherein:
the selecting unit includes:
a selecting gear provided at one side of the main gear to correspond to the first connecting gear;
a selecting lead screw connected to the selecting gear and rotating together with the selecting gear;
a selecting movement block engaged in the selecting lead screw movable along the selecting lead screw with the rotation of the selecting lead screw;
a selecting shaft disposed vertically to the selecting lead screw;
a selecting fork connected with the selecting shaft and moving the shift fork on the control shaft with rotation of the selecting shaft; and
a selecting yoke having one end connected to the selecting movement block and another end connected to rotate the selecting shaft to rotate the selecting shaft with movement of the selecting movement block.

6. The apparatus of claim 5, wherein:
the selecting movement block includes a first suspending protrusion that protrudes; and
the selecting yoke includes a selecting yoke groove into which the first suspending protrusion is inserted.

7. The apparatus of claim 5, wherein:
in the shift fork;
a fixation protrusion into which the selecting fork is inserted is formed on the outer periphery of the shift fork.

8. The apparatus of claim 5, further comprising:
a first position sensor provided at one side of the selecting shaft to sense a rotation amount of the selecting shaft.

9. The apparatus of claim 1, wherein:
the shifting unit includes:
a shift gear provided at another side of the main gear to correspond to the second connecting gear;
a shift lead screw connected with the shift gear and rotating together with the shift gear;
a shift movement block engaged in the shift lead screw movable along the shift lead screw with rotation of the shift lead screw; and
a shift yoke connected to the shift movement block and connected to another side of the control shaft to rotate the control shaft with movement of the shift movement block.

10. The apparatus of claim 9, wherein:
the shift movement block includes a second suspending protrusion that protrudes; and
the shift yoke includes a shift yoke groove into which the second suspending protrusion is inserted.

11. The apparatus of claim 9, further comprising:
a second position sensor mounted on another side of the control shaft to verify a shift step by sensing a rotation amount of the control shaft rotated by the shifting unit.

* * * * *